(12) United States Patent
Yasuda et al.

(10) Patent No.: US 7,007,970 B2
(45) Date of Patent: Mar. 7, 2006

(54) AIRBAG APPARATUS FOR AUTOMOBILE

(75) Inventors: Mitsuo Yasuda, Fukumitsu-machi (JP); Yoshiharu Nakashima, Fukumitsu-machi (JP); Yusuke Ishiguro, Fukumitsu-machi (JP)

(73) Assignee: Sanko Gosei Kabushiki Kaisha, Toyama-Ken (JP)

(*) Notice: Subject to any disclaimer, the term of this patent is extended or adjusted under 35 U.S.C. 154(b) by 83 days.

(21) Appl. No.: 10/449,135

(22) Filed: May 28, 2003

(65) Prior Publication Data
US 2004/0026902 A1  Feb. 12, 2004

(30) Foreign Application Priority Data
Aug. 6, 2002 (JP) .............................. 2002-228758

(51) Int. Cl.
*B60R 21/20* (2006.01)
(52) U.S. Cl. ..................... 280/728.3; 280/731; 280/732
(58) Field of Classification Search ............ 280/728.2, 280/728.3, 732, 728.1, 731
See application file for complete search history.

(56) References Cited

U.S. PATENT DOCUMENTS

| 4,148,503 | A | 4/1979 | Shiratori et al. ............ 280/731 |
|---|---|---|---|
| 5,183,288 | A | 2/1993 | Inada et al. ................. 280/732 |
| 5,322,324 | A | 6/1994 | Hansen et al. .............. 280/732 |
| 5,411,288 | A | 5/1995 | Steffens, Jr. .............. 280/728.3 |
| 5,549,324 | A | 8/1996 | Labrie et al. ............ 280/728.3 |
| 5,569,959 | A | 10/1996 | Cooper et al. ........... 280/728.3 |
| 5,685,560 | A | 11/1997 | Sugiyama et al. .......... 280/731 |
| 5,738,367 | A | 4/1998 | Zichichi et al. .......... 280/728.3 |
| 5,769,451 | A | 6/1998 | Inada et al. ................. 280/732 |
| 5,779,262 | A | 7/1998 | Totani et al. ............ 280/728.3 |
| 5,806,879 | A | 9/1998 | Hamada et al. .......... 280/728.2 |
| 5,816,609 | A | 10/1998 | Gray et al. .............. 280/728.3 |
| 5,839,752 | A | 11/1998 | Yamasaki et al. ........ 280/728.3 |
| 5,863,064 | A | 1/1999 | Rheinlander et al. ....... 280/732 |
| 5,865,461 | A | 2/1999 | Totani et al. ............ 280/728.3 |
| 5,868,419 | A | 2/1999 | Taguchi et al. .......... 280/728.3 |
| 5,961,142 | A | 10/1999 | Shiraki et al. ........... 280/728.3 |
| 6,012,735 | A | 1/2000 | Gray et al. .............. 280/728.2 |
| 6,070,901 | A | 6/2000 | Hazell et al. ............ 280/728.3 |
| 6,076,851 | A | 6/2000 | Davis, Jr. et al. ........ 280/728.2 |
| 6,079,734 | A | 6/2000 | Porter ..................... 280/728.3 |
| 6,089,642 | A | 7/2000 | Davis, Jr. et al. ............. 296/70 |
| 6,109,645 | A | 8/2000 | Totani et al. ............ 280/728.3 |
| 6,161,865 | A | 12/2000 | Rose et al. .............. 280/728.3 |

(Continued)

FOREIGN PATENT DOCUMENTS

JP  06-144142  5/1994

(Continued)

OTHER PUBLICATIONS

U.S. Appl. No. 09/843,083, filed Apr. 25, 2001, Kurachi et al.

(Continued)

*Primary Examiner*—Paul N. Dickson
*Assistant Examiner*—Toan C. To
(74) *Attorney, Agent, or Firm*—Ladas & Parry LLP (57) ABSTRACT

An airbag apparatus for an automobile includes an airbag case for accommodating an airbag, a fracture-opening section of the surface panel, and a reinforcement frame member having a frame portion, at least one fracture-section reinforcement portion, and an edge reinforcement potion. The frame portion has an engagement portion to which the airbag case is connected. The fracture-section reinforcement portion is joined to the inside surface of the surface panel to cover and reinforce the fracture-opening section. The edge reinforcement portion is joined to the inside surface of the surface panel to cover and reinforce a surface panel portion surrounding the fracture-opening section.

12 Claims, 10 Drawing Sheets

U.S. PATENT DOCUMENTS

| | | | |
|---|---|---|---|
| 6,203,056 B1 | 3/2001 | Labrie et al. | 280/728.3 |
| 6,250,669 B1 | 6/2001 | Ohmiya | 280/732 |
| 6,299,198 B1 | 10/2001 | Nakashima et al. | 280/728.3 |
| 6,340,170 B1 | 1/2002 | Davis et al. | 280/730.1 |
| 6,394,485 B1 | 5/2002 | Amamori | 280/728.2 |
| 6,406,056 B1 | 6/2002 | Yokota | 280/728.2 |
| 6,435,542 B1 | 8/2002 | Nakashima et al. | 280/728.3 |
| 6,494,481 B1 | 12/2002 | Yasuda | 280/732 |
| 6,601,870 B1 * | 8/2003 | Suzuki et al. | 280/728.3 |
| 6,692,017 B1 * | 2/2004 | Taoka et al. | 280/728.2 |
| 6,726,239 B1 * | 4/2004 | Teranishi et al. | 280/728.3 |
| 2002/0005630 A1 | 1/2002 | Suzuki et al. | 280/728.3 |
| 2003/0184063 A1 * | 10/2003 | Yasuda et al. | 280/732 |
| 2004/0056455 A1 * | 3/2004 | Nishijima et al. | 280/728.3 |
| 2004/0075251 A1 * | 4/2004 | Fujii et al. | 280/728.3 |

FOREIGN PATENT DOCUMENTS

| | | |
|---|---|---|
| JP | 07-172256 | 7/1995 |
| JP | 07-291078 | 11/1995 |
| JP | 10-044910 | 2/1998 |
| JP | 11-198752 | 7/1999 |
| JP | P2001-206180 A | 7/2001 |

OTHER PUBLICATIONS

U.S. Appl. No. 09/975,665, filed Oct. 10, 2001, Yasuda et al.
U.S. Appl. No. 10/008,862, filed Nov. 7, 2001, Taoka et al.
U.S. Appl. No. 10/392,132, filed Mar. 18, 2003, Yasuda et al.

* cited by examiner

AIRBAG APPARATUS FOR AUTOMOBILE

CROSS REFERENCE TO RELATED APPLICATIONS

The subject matter of the present application may also be related to the following U.S. Patent Applications: "Structure of Reinforcement Plate Member Used in Automobile Airbag Apparatus," Ser. No. 09/843,083, filed Apr. 25, 2001; "Airbag Device for Use in a Vehicle," Ser. No. 09/975,665, filed Oct. 10, 2001; "Airbag Apparatus for Automobile," Ser. No. 10/008,862, filed Nov. 7, 2001; "Airbag Apparatus for Automobile," Ser. No. 10/392,132, filed Mar. 18, 2003; "Airbag Apparatus for Front Passenger Seat," Ser. No. 09/847,550, filed May 2, 2001 (now U.S. Pat. No. 6,435,542), and "Airbag Apparatus for Front Passenger Seat," Ser. No. 09/836,664, filed Apr. 17, 2001 (now U.S. Pat. No. 6,494,481).

BACKGROUND OF THE INVENTION

1. Field of the Invention

The present invention relates to an airbag apparatus for an automobile for protecting a person in an automobile such as a car; for example, a driver or a passenger sitting in the front passenger seat, from impact upon head-on or side collision of the automobile to thereby ensure safety of the person. More particularly, the invention relates to an improvement in the structure for attachment of a reinforcement member.

2. Description of the Related Art

An airbag apparatus for a front passenger seat or a driver seat of an automobile, such as a car, or that to be mounted on a side pillar of the automobile basically includes an airbag, an airbag case for accommodating the folded airbag, and an inflater for inflating the airbag. The airbag apparatus is disposed inside an interior surface panel of the automobile.

A typical example of such an interior surface panel is an instrument panel cover which is made of a thermoplastic resin material, such as polypropylene, and which covers the surface of an instrument panel core formed integrally from a thermoplastic resin material, such as polypropylene.

Figure 1:
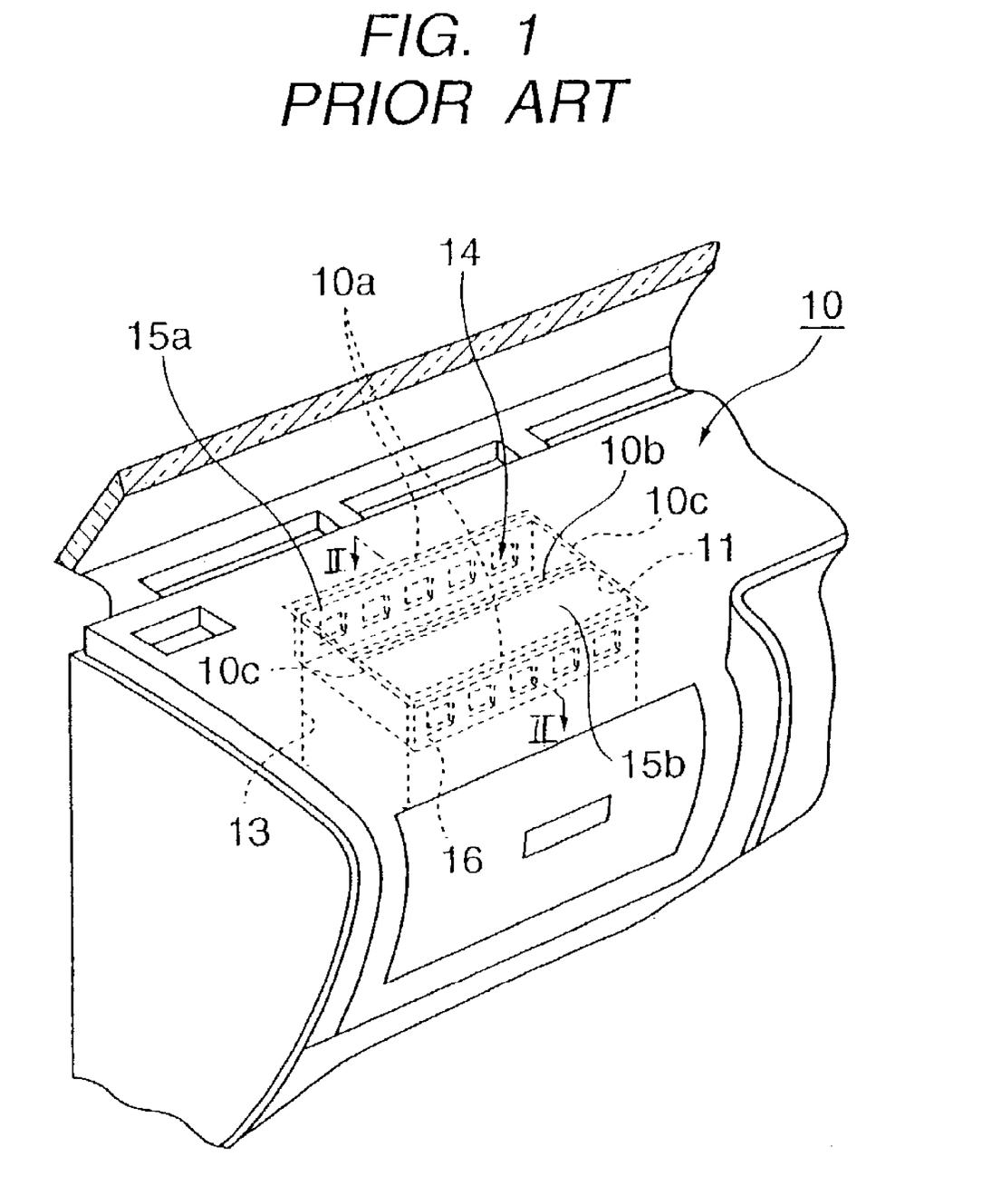
FIG. 1 is a schematic perspective view of a conventional airbag apparatus for a front passenger seat, showing an instrument panel cover having a fracture-opening section for allowing an inflating airbag to project outward therethrough.
Figure 2:
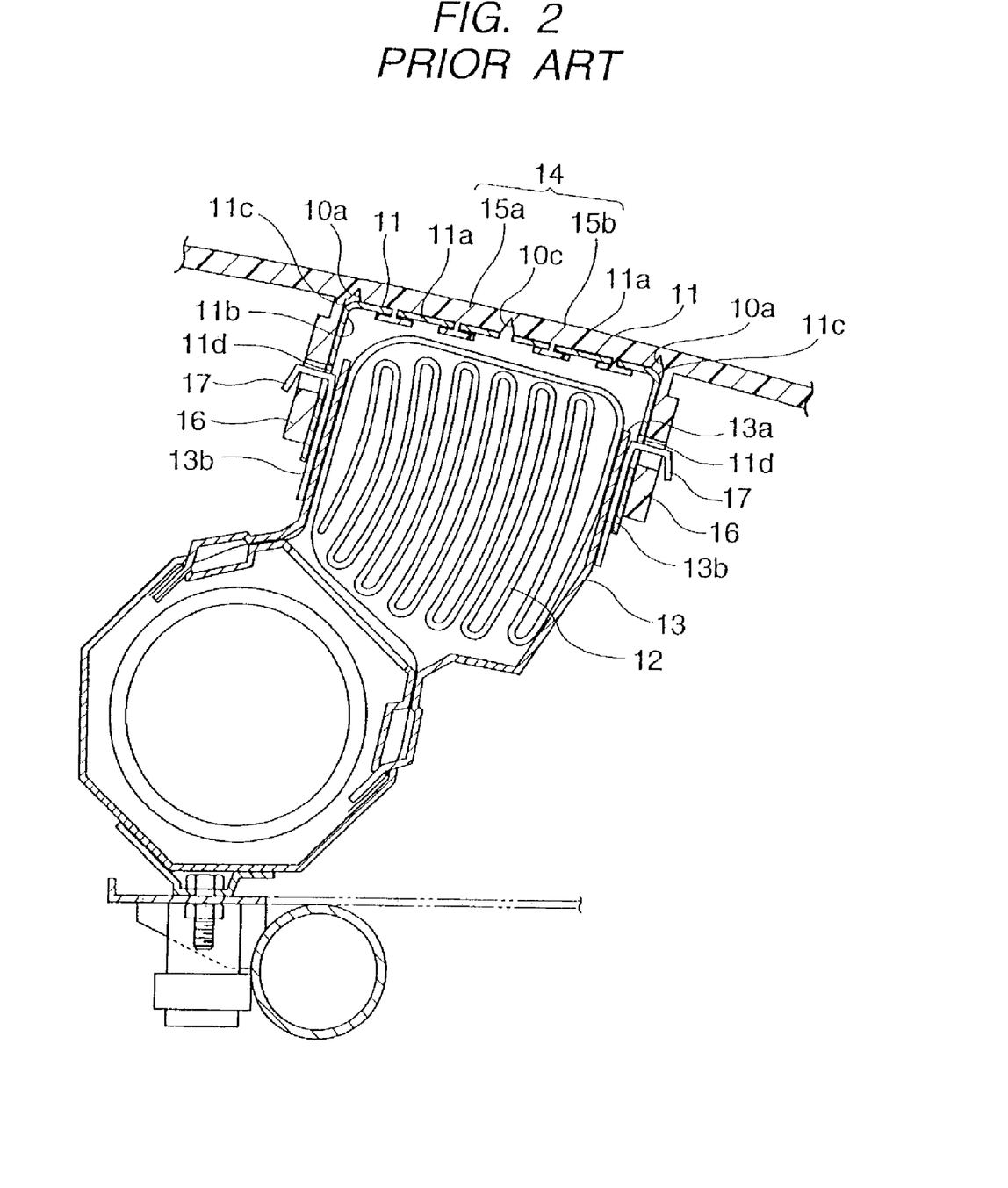
FIG. 2 is a schematic sectional view taken along line II—II of FIG. 1.

Conventionally, a seamless-type airbag apparatus for a front passenger seat has been provided. As shown in FIGS. 1 and 2, the seamless-type airbag apparatus is designed to render a fracture groove of a fracture-opening section of an instrument panel cover invisible.

Specifically, as shown in FIGS. 1 and 2, the instrument panel cover 10 has a fracture-opening section 14 having a size corresponding to that of an opening portion 13a of an airbag case 13. The fracture-opening section 14 is formed through provision of front and back hinge grooves 10a extending longitudinally, a center fracture groove 10b extending longitudinally, and side fracture grooves 10c extending transversely. These grooves 10a, 10b, and 10c are formed on the inside surface of the instrument panel cover 10 by use of a laser. Specifically, a pulsating laser beam is perpendicularly applied to the inside surface of the instrument panel cover 10 while being moved along peripheral edges of a pair of reinforcement plate members 11 fixed to the inside surface, thereby forming the grooves 10a, 10b, and 10c.

The longitudinally extending center fracture groove 10b and the side fracture grooves 10c formed perpendicularly to the fracture groove 10b divide the fracture-opening section 14 into a front fracture-opening subsection 15a and a rear fracture-opening subsection 15b. Upon inflation of an airbag, the fracture-opening subsections 15a and 15b are split apart from each other in a casement condition (in opposite directions) while hinging on the front and rear hinge grooves 10a and 10b.

When, upon inflation of an airbag, the fracture-opening section 14 of the instrument panel cover 10 is split open by pressure of the inflating airbag 12, the front and rear hinge groove 10a may be broken, with a resultant separation of the fracture-opening subsections 15a and 15b from the instrument panel cover 10. In order to avoid this problem, the conventional air bag apparatus employs a reinforcing structure including the above-mentioned paired reinforcement plate members 11, which are provided on the inside surface of the fracture-opening section 14 of the instrument panel cover 10. Specifically, a frame-shaped reinforcement rib 16 is formed integrally with the instrument panel cover 10 in such a manner that the rib 16 projects from the inside surface of the instrument panel cover 10, and the rib 16 defines a rectangular space slightly larger than the opening portion 13a of the airbag case 13. The paired reinforcement plate members 11 are disposed within the rectangular space defined by the rib 16. The horizontal portions 11a of the reinforcement plate members 11 are fixedly attached to the inside surface of the fracture-opening section 14 through thermal joining or like processing. Vertical portions 11b of the reinforcement plate members 11 are bent at their hinge portions 11c and extend downward along the inner surfaces of front and rear walls of the reinforcement rib 16. The front and rear walls of the reinforcement rib 16 and the corresponding vertical portions 11b of the reinforcement plate members 11 are engaged with corresponding hooks 17 attached to front and rear walls 13b of the airbag case 13. The reinforcement plates 11 prevent scattering of the fracture-opening subsections 15a and 15b of the fracture-opening section 14 of the instrument panel cover 10 upon inflation of the airbag.

In order to allow the fracture-opening subsections 15a and 15b to be split open smoothly, hook engagement holes 11d formed in the vertical portions 11b of the paired reinforcement plate members 11 assume a sufficiently large size so as to allow upward movement of the vertical portions 11b when the fracture-opening subsections 15a and 15b are split open.

The thus-configured airbag apparatus functions in the following manner. Upon collision of the automobile, an impact force caused by the collision is detected by a sensor. A control unit including a CPU judges whether or not the detected impact force is equal to or greater than a predetermined value. When the control unit judges that the impact force is equal to or greater than the predetermined value, the control unit issues a signal for causing the inflater to generate a predetermined gas. The gas is fed to the airbag so as to promptly inflate the airbag.

The inflating airbag presses, from inside, the fracture-opening section 14 of the instrument panel cover 10. The fracture-opening section 14 is fractured along the center fracture groove 10b and the side fracture grooves 10c, whereby the fracture-opening subsections 15a and 15b are split open about the front and rear hinge grooves 10a. The thus-opened front and rear fracture-opening subsections 15a and 15b are further opened while being turned inside out about the hinge portions 11c of the reinforcement plate members 11.

Simultaneously, the inflating airbag 12 projects outward from the instrument panel cover 10 through the thus-opened fracture-opening section 14. Serving as a cushion, the inflated airbag 12 supports a front seat passenger at his/her chest and head, thereby protecting the passenger from the impact force of collision.

In the above-described airbag apparatus, the reinforcement plate members 11 and the reinforcement rib 16 are provided on the inside surface of the instrument panel cover 10 in a peripheral region around the fracture-opening section 14. However, in order to facilitate the installation work of the airbag case 13 and fracture-opening of the fracture-opening subsections 15a and 15b, vertical play is provided between the hook engagement holes 11d and the hooks 17. That is, the reinforcement plate members 11 and the reinforcement rib 16 are not configured to support a pressing force imposed from above; i.e., a pressing force imposed on the instrument panel cover 10. If a load is mistakenly imposed on the instrument panel cover 10, the hinge grooves 10a, the center fracture groove 10b, and/or the side fracture grooves 10c may be fractured. As a result, the fracture-opening section 14 is dented or the peripheral edge of the fracture-opening section 14 is deformed, thereby damaging the appearance of the instrument panel cover 10.

Further, conceivably, the conventional airbag apparatus has a drawback in that when the air bag apparatus operates, the inner side surfaces of the reinforcement ribs 16 are pushed outward at the beginning of airbag inflation, and cracks are generated in the corners at the circumferential edge of the fracture opening portion of the instrument panel cover 10, with resultant scattering of the reinforcement ribs 16.

In the conventional airbag apparatus, the pair of reinforcement plate members 11 are fixed to the inside surface of the fracture-opening section 14 of the instrument panel cover 10 so as to extend frontward and rearward, respectively, from the central fracture groove 10b. However, since the reinforcement plate members 11 are each formed of a metallic plate, the metallic plates are exposed when the reinforcement plate members 11 are turned inside out upon inflation of the air bag, and this is not desirable from the viewpoint of safety. Further, during recycling, the reinforcement plate members 11 formed of metallic plates must be separated from the instrument panel cover 10 formed of plastic. However, this separation work is cumbersome, because the reinforcement plate members 11 are fixedly secured to the instrument panel cover 10 by means of thermal joining or like processing.

SUMMARY OF THE INVENTION

In view of the foregoing, an object of the present invention is to provide an airbag apparatus for an automobile exhibiting improved resistance to a pressing load imposed externally on a fracture-opening section and its peripheral region of a surface panel covering an instrument panel region, a side pillar region, or a central portion of a steering wheel of an automobile.

Another object of the present invention is to provide an airbag apparatus for an automobile in which a reinforcement frame member having a fracture-section reinforcement portion welded to a fracture-opening section of a surface panel and an edge reinforcement portion welded to a surface panel portion surrounding the fracture-opening section is formed of a thermoplastic resin material as in the case of the surface panel, to thereby enable the surface panel and the reinforcement frame member to be joined through vibration welding, facilitate assembly, and eliminate the necessity of disassembly work at the time of recycling.

To achieve the above objects, the present invention provides an airbag apparatus for an automobile which comprises an airbag case for accommodating an airbag in a folded condition, the airbag case being disposed behind a surface panel provided within the automobile; a fracture-opening section of the surface panel, the fracture-opening section facing an opening of the airbag case and being defined by means of fracture grooves formed on an inside surface of the surface panel; and a reinforcement frame member having a frame portion, at least one fracture-section reinforcement portion, and an edge reinforcement portion, which are integrally formed at an upper end portion of the frame portion. The frame portion has an engagement portion to which the airbag case is connected. The fracture-section reinforcement portion is joined to the inside surface of the surface panel to cover and reinforce the fracture-opening section. The edge reinforcement portion is joined to the inside surface of the surface panel to cover and reinforce a surface panel portion surrounding the fracture-opening section.

Preferably, the frame portion has a front side wall, a rear side wall, a left side wall, and a right side wall, which form a rectangular tubular shape; the edge reinforcement portion extends outward from an upper end portion of the frame portion in a generally horizontal direction; the fracture-section reinforcement portion extends inward from the upper end portion of the frame portion via a hinge portion having a wavy bent section; and the fracture-section reinforcement portion and the edge reinforcement portion are fixed to the inside surface of the surface panel by means of vibration welding.

The fracture-opening section of the surface panel may be defined to have a rectangular shape and to be opened toward a single direction; and the reinforcement frame member may have a single fracture-section reinforcement portion extending from the front or rear side wall of the frame portion via a hinge portion having a wavy bent section.

Alternatively, the fracture-opening section of the surface panel may be defined to have a rectangular shape and to be cut, along a longitudinally extending center line, into two fracture-opening subsections to be opened toward opposite directions; and the reinforcement frame member may have a pair of fracture-section reinforcement portions extending from the front and rear side walls, respectively, of the frame portion via corresponding hinge portions each having a wavy bent section.

Alternatively, the fracture-opening section of the surface panel may be defined to have a rectangular shape and to be cut into left-hand, right-hand, front, and rear fracture-opening subsections to be opened toward four directions; and the reinforcement frame member may have four fracture-section reinforcement portions extending from the front, rear, left, and right side walls, respectively, of the frame portion via corresponding hinge portions each having a wavy bent section.

Preferably, the reinforcement frame member is formed of a thermoplastic resin material of high flexibility such as olefin elastomer.

Preferably, the fracture-section reinforcement portion and the edge reinforcement portion of the reinforcement frame member are vibration-welded to the inside surface of the surface panel in a state in which the hinge portion is compressed toward an inclined connection portion of the edge reinforcement portion.

Preferably, the airbag case is separably connected to the frame portion of the reinforcement frame member.

Preferably, a plurality of projections, each assuming the shape of a ridge, are formed at predetermined intervals on surfaces of the fracture-section reinforcement portion and the edge reinforcement portion, the surfaces facing the inside surface of the surface panel; and the fracture-section reinforcement portion and the edge reinforcement portion are joined, by means of vibration welding, to the inside surface of the surface panel via the projections. In this case, each of the projections preferably assumes the shape of a broken ridge.

Preferably, the engagement portion of the frame portion to which the airbag case is connected is formed in each of the front and rear side walls of the frame portion and is constituted by a group of rectangular holes; and hooks of the airbag case are inserted into the rectangular holes in such a manner that the hooks engage wall surfaces of the rectangular holes when the airbag inflates.

In the airbag apparatus according to the present invention, since the edge reinforcement portion and the fracture-section reinforcement portion(s) are formed integrally with the frame portion, assembly work is facilitated. Further, when a pressing force is imposed on the upper surface of the surface panel, the edge reinforcement portion of the reinforcement frame member supports the surface panel, thereby preventing occurrence of a dent in the fracture-opening section and deformation of the peripheral edge of the fracture-opening section.

By virtue of the configuration such that the fracture-section reinforcement portion extends from the upper end portion of the frame portion via a hinge portion having a wavy bent section, the hinge portion can extend upon opening of the fracture-section reinforcement portion, to thereby suppress impact force that acts on the welded portion between the fracture opening section and the fracture-section reinforcement portion.

By virtue of the configuration such that the reinforcement frame member is formed of a thermoplastic resin material of high flexibility, such as olefin elastomer, which is the same as the material of the surface panel, the surface panel and the reinforcement frame member can be joined together by means of vibration welding, thereby facilitating welding work. Further, this configuration eliminates disassembly work which has conventionally been performed, during recycling, in order to separate frame members and reinforcement plate members formed of metallic plates from surface panels formed of plastic.

By virtue of the configuration such that the airbag case is separably connected to the reinforcement frame member, when a car is to be scrapped, the airbag case can be easily detached from the reinforcement frame member, so that an inflater and other relevant components can be easily removed for proper disposal to thereby prevent potential environmental contamination.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 5A and 5B are cross-sectional views of the reinforcement frame member, wherein

DESCRIPTION OF THE PREFERRED EMBODIMENTS

Embodiments of the present invention will next be described in detail with reference to the drawings.

FIGS. 3–8 show an airbag apparatus for an automobile according to a first embodiment of the present invention and applied to use with a front passenger seat.

Figure 3:
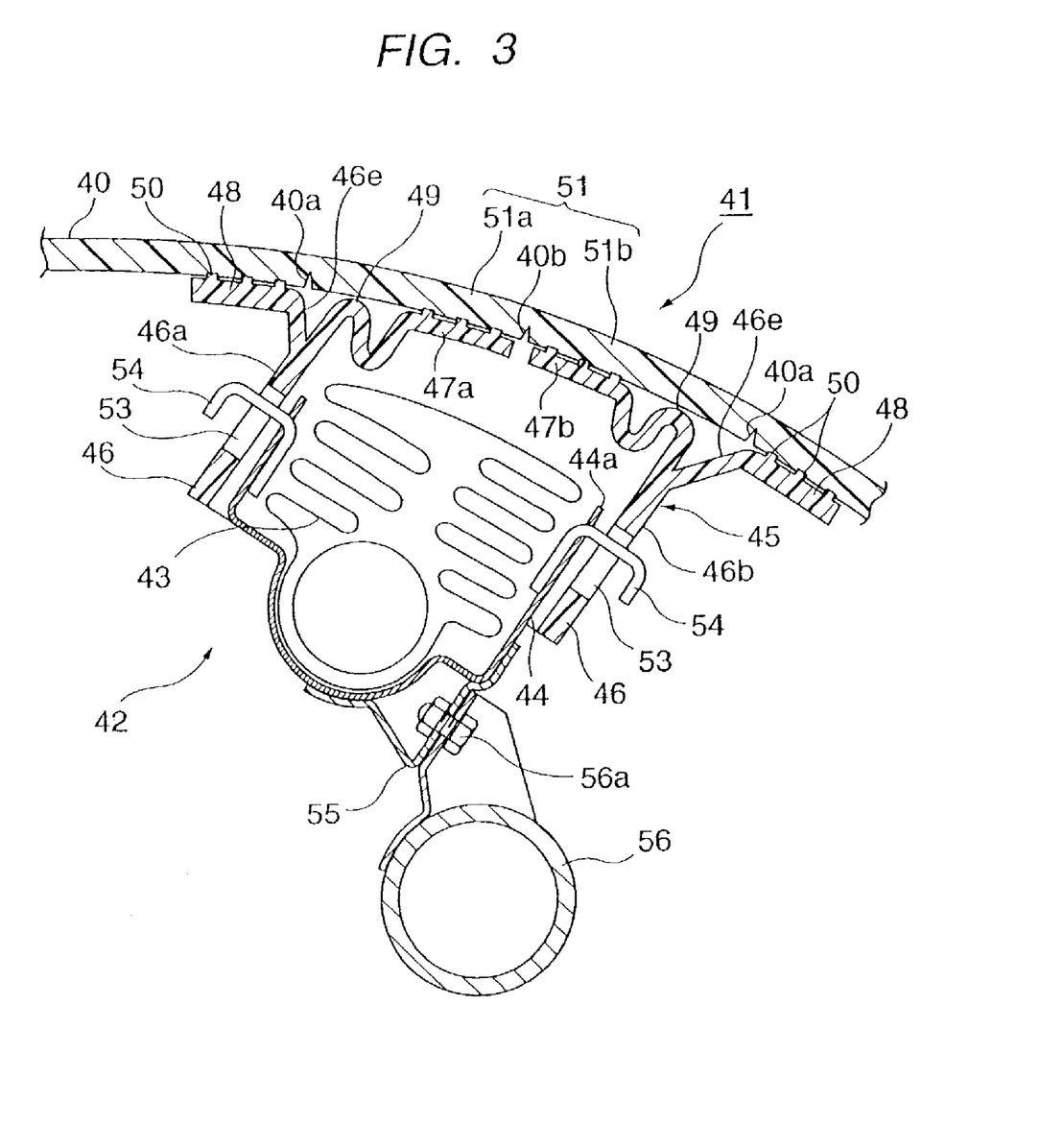
FIG. 3 is a vertical sectional view of a main portion of an airbag apparatus for an automobile according to a first embodiment of the present invention and applied to use with a front passenger seat.

In FIG. 3, reference numeral 40 denotes an integrally molded instrument panel cover made mainly of a thermoplastic resin, such as polypropylene. The instrument panel cover 40, which serves as s surface panel, covers an instrument panel core (not shown) fixed to an unillustrated car body and is fixedly attached to the instrument panel core by use of appropriate means, such as tapping screws.

As shown in FIG. 3, an accommodation section 42 for accommodating an airbag apparatus for an automobile 41 is formed behind a left-hand portion (for right-hand drive) of the instrument panel cover 40 in opposition to a front passenger seat. A left-hand drive automobile employs a mirror image of the configuration of the present embodiment; i.e., the accommodation section 42 is formed behind a right-hand portion of the instrument panel cover 40.

The airbag apparatus for an automobile 41 includes an airbag 43 to be inflated by means of gas from an inflater; an airbag case 44 which accommodates the airbag 43 in a folded condition and which has an opening portion 44a at its upper end; and a reinforcement frame member 45 which is formed of a thermoplastic resin material which is similar to that of the instrument panel cover 40. The reinforcement frame member 45 has a frame portion 46, a pair of fracture-section reinforcement portions 47a and 47b branching and extending inward from an upper portion of the frame portion 46 and adapted to reinforce a fracture-opening section 51, and an edge reinforcement portion 48 branching and extending outward from the upper portion of the frame portion 46 and adapted to reinforce a circumferential edge of the fracture-opening section 51. The fracture-opening section 51 consists of front and rear fracture-opening subsections 51a and 51b, which will be described later.

Figure 4:
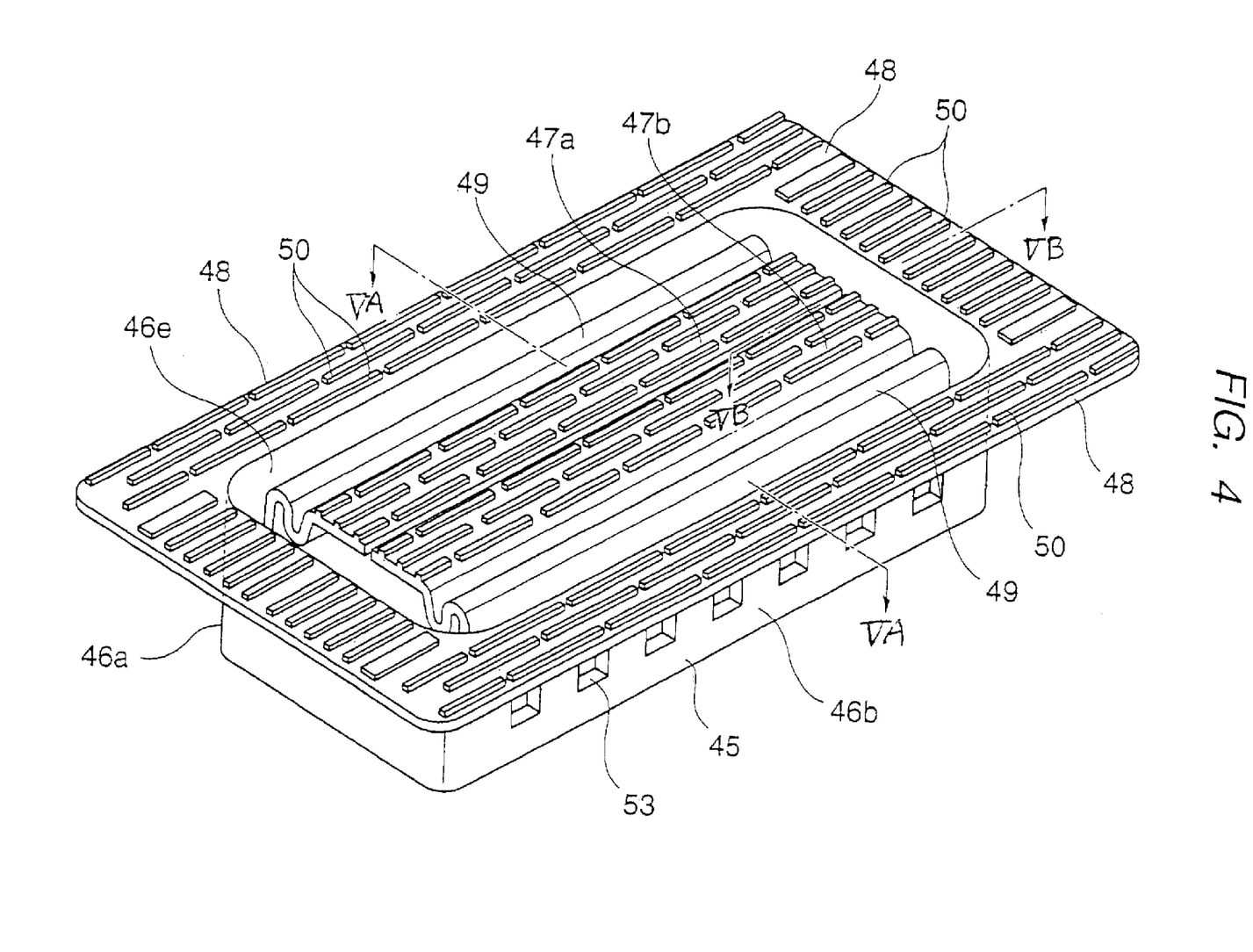
FIG. 4 is an overall perspective view of a reinforcement frame member shown in FIG. 3.

The frame portion 46 has a front side wall 46a, a rear side wall 46b, a left side wall 46c, and a right side wall 46d, which together form the shape of a rectangular tube. The above-described edge reinforcement portion 48 is connected to the upper ends of the four side walls of the frame portion 46 via corresponding inclined connection walls 46e which are inclined outward. The edge reinforcement portion 48 has a generally horizontal upper surface of a rectangular shape and surrounds the fracture-opening section 51. Further, the above-described pair of fracture-section reinforcement portions 47a and 47b are connected to the upper ends of the front and rear side walls 46a and 46b of the frame portion 46 via hinge portions 49, which are branched from the base portions of the corresponding inclined connection walls 46e of the edge reinforcement portion 48 and are bent in a wavy shape.

In the present embodiment, the frame portion 46, the edge reinforcement portion 48, and the fracture-section reinforcement portions 47a and 47b are integrally formed, through injection molding, from a thermoplastic resin material having a high degree of flexibility (low rigidity), such as olefin elastomer.

Figure 5A:
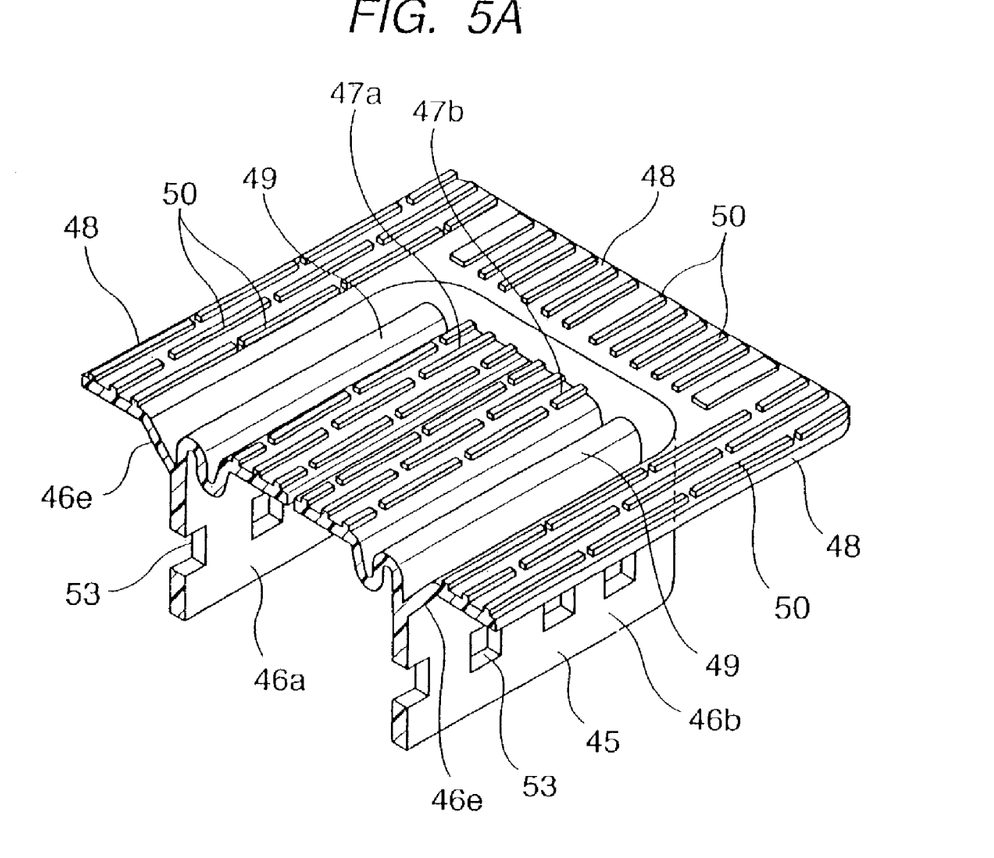
FIG. 5A is a cross-sectional perspective view taken along line VA—VA in FIG. 4.
Figure 5B:
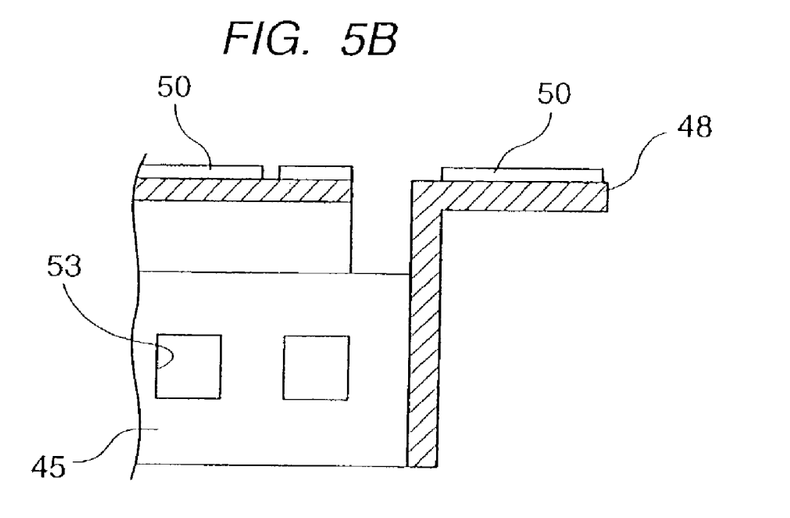
FIG. 5B is a cross-sectional view taken along line VB—VB in FIG. 4.

A plurality of projections 50, each formed of a broken ridge, are provided at predetermined intervals on the upper surfaces of the fracture-section reinforcement portions 47a and 47b and on the upper surface of the edge reinforcement portion 48, which upper surfaces face the inner or reverse surface of the instrument panel cover 40. The fracture-section reinforcement portions 47a and 47b and the edge reinforcement portion 48 are fixed, by means of vibration welding, to the inside or reverse surface of the instrument panel cover 40 via the projections 50.

Further, the above-described fracture-opening section 51 is defined in the instrument panel cover 40 in opposition to the accommodation section 42. Upon inflation of the airbag 43, the fracture-opening section 51 is split open by pressing force of the air bag 43.

The fracture-opening section 51 is formed as follows. Hinge grooves 40a extending along the longitudinal direction (right-left direction) and side fracture grooves 40c extending along the transverse direction (front-back direction) are formed on the inside surface of the instrument panel cover 40 through laser processing, to thereby define the fracture-opening section 51 assuming a rectangular shape substantially identical with that of the opening portion 44a of the airbag case 44. A center fracture groove 40b is formed, through laser processing, on the fracture-opening section 51 along the longitudinal direction of the fracture-opening section 51 in such a manner as to extend between the centers of the side fracture grooves 40c. Upon inflation of the airbag 43, the fracture-opening section 51 is fractured at the side fracture grooves 40c and the center fracture groove 40b. As a result, as shown in FIG. 6, the fracture-opening section 51 is split into fracture-opening subsections 51a and 51b such that the fracture-opening subsections 51a and 51b are turned inside out, in opposite directions, about hinges 52, which are implemented by the corresponding hinge grooves 40a.

A plurality of square holes 53 serving as engagement portions are formed in longitudinally extending front and rear side walls 46a and 46b of the frame portion 46. Hooks 54 fixedly provided on the front and rear side walls of the airbag case 44 are engaged with the square holes 53.

Figure 6:
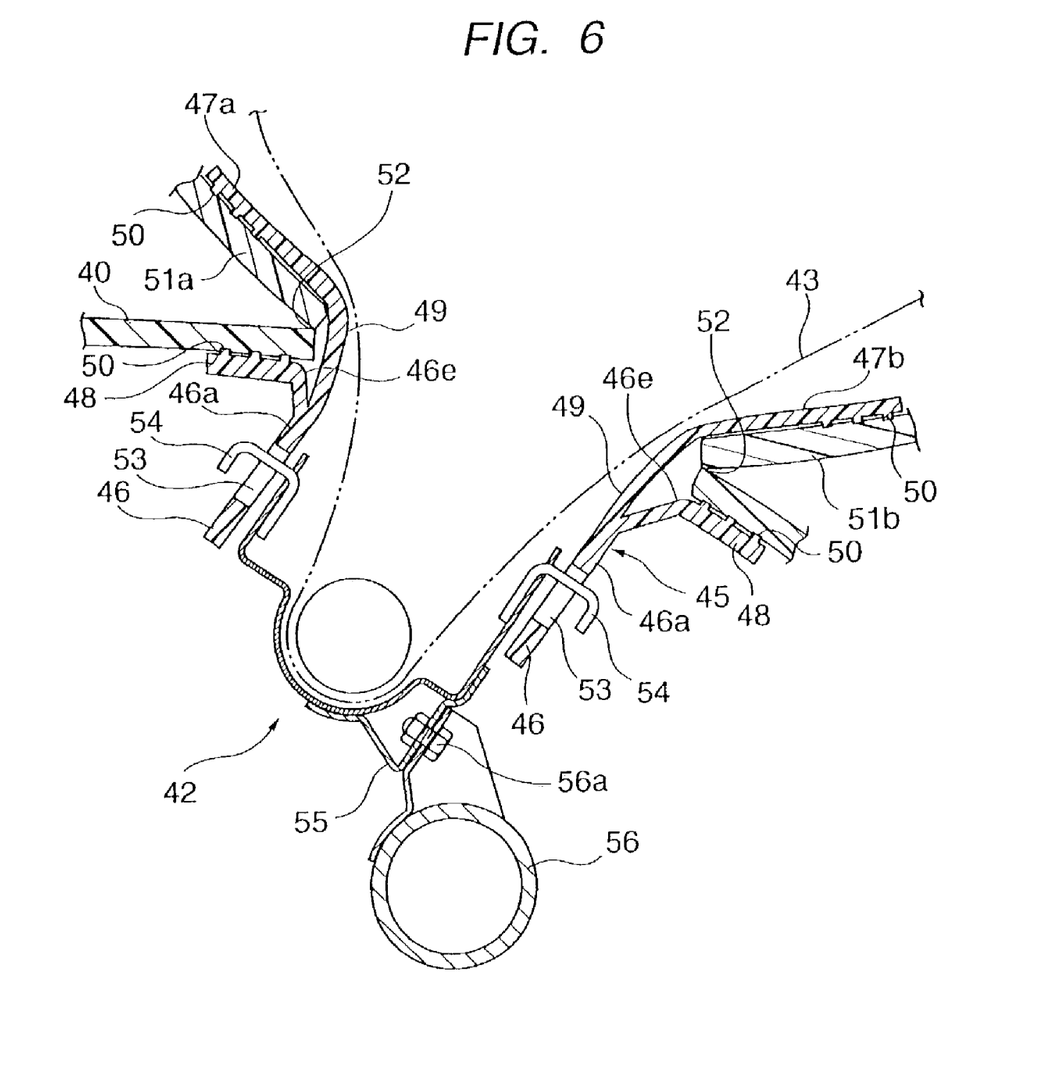
FIG. 6 shows an explanatory sectional view of the airbag apparatus of FIG. 3 in an operated state.

The fracture-section reinforcement portions 47a and 47b, which are integrally formed with the frame portion 46, are connected to the fracture-opening subsections 51a and 51b, so that the fracture-section reinforcement portions 47a and 47b can be swung, about the hinge portions 49 having wavy bent sections, from a position shown in FIG. 3 in which the fracture-section reinforcement portions 47a and 47b close the panel-cover-side opening of the frame portion 46 to a position shown in FIG. 6 in which the fracture-section reinforcement portions 47a and 47b allow inflation of the airbag 43.

In the present embodiment, since the fracture-section reinforcement portions 47a and 47b are connected to the frame portion 46 via the hinge portions 49 having wavy bent sections, during inflation of the airbag 43, initial pressure that acts on the fracture-section reinforcement portions 47a and 47b stemming from deformation of the fracture-opening subsections 51a and 51b can be absorbed by means of the hinge portions 49 having wavy bent sections, whereby the fracture-opening subsections 51a and 51b can be opened smoothly.

The airbag case 44, which accommodates the airbag 43, is disposed below the reinforcement frame member 45. Hooks 44b are fixedly provided on the side walls of the opening portion 44a of the airbag case 44. The hooks 44b are passed through and engaged with the engagement portions (rectangular holes) 53 of the reinforcement frame member 45. An unillustrated inflater for supplying gas to the airbag 43 is disposed at the lower end of the airbag case 44.

The airbag case 44 is fixed via a support member 55 to a stationary member of the body of the automobile, such as a cross member 56, by use of bolts and nuts 56a.

The thus-configured airbag apparatus according to the first embodiment functions in the following manner. Upon collision of the automobile, an impact force caused by the collision is detected by an unillustrated known sensor. An unillustrated control unit including a known CPU judges whether or not the detected impact force is at least equal to a predetermined value. When the control unit judges that the impact force is at least equal to the predetermined value, the control unit issues a signal for causing the unillustrated inflater to generate a predetermined gas. The gas is fed to the airbag 43 so as to promptly inflate the airbag 43 (see FIG. 6).

When the airbag 43 inflates, pressure generated at the initial stage of inflation of the airbag 43 is imposed on the inner surfaces of the fracture-section reinforcement portions 47a and 47b and the inner surface of the frame portion 46. However, the frame portion 46 is hardly affected by the inflation, because the frame portion 46 is connected to the edge reinforcement portion 48 via the outward inclined connection walls 46e. Further, since the edge reinforcement portion 48 is pulled inward and downward, expansion of the circumferential edge of the opening of the instrument panel cover 40 can be reduced so as to prevent cracking. The fracture-opening subsections 51a and 51b welded to the fracture-section reinforcement portions 47a and 47b sequentially fracture along the center fracture groove 40b and the side fracture grooves 40c. Then, as shown in FIG. 6, the fracture-section reinforcement portions 47a and 47b joined to the fracture-opening subsections 51a and 51b are opened outward in opposite directions while being turned inside out about the hinge portions 49, each of which has a wavy bent section and can be elongated. Therefore, large force acting on the welded portion between the fracture-opening subsections 51a and 51b and the fracture-section reinforcement portions 47a and 47b can be absorbed. Further, during the final stage of inflation, that force can be absorbed by the gaps between the hooks 54 and the wall surfaces of the square holes 53 of the frame portion 46. This pressure-absorbing mechanism can prevent generation of damage to the circumferential edge of the opening of the instrument panel cover 40, to thereby enable the fracture-opening subsections 51a and 51b and the fracture-section reinforcement portions 47a and 47b to smoothly open in a casement condition as shown in FIG. 6.

As described above, in the first embodiment, the reinforcement frame member 45 is composed of the frame portion 46, the edge reinforcement portion 48, and the paired fracture-section reinforcement portions 47a and 47b, which are integrally formed; the paired fracture-section reinforcement portions 47a and 47b, which face each other at the center of the fracture-opening section 51, are connected to the front and rear side walls 46a and 46b of the frame portion 46 via the hinge portions 49 each having a wavy bent section; and the fracture-section reinforcement portions 47a and 47b are joined to the reverse surfaces of the fracture-opening subsections 51a and 51b by means of vibration welding. This configuration enables the hinge portions to extend upon opening of the fracture-section reinforcement portions 47a and 47b, to thereby suppress impact force that acts on the welded portion between the front and rear fracture-opening subsections 51a and 51b and the fracture-section reinforcement portions 47a and 47b.

Further, in the first embodiment, since a portion of the instrument panel cover 40 around the fracture-opening section 51 (hereinafter referred to as an "opening surrounding portion") is welded to the edge reinforcement portion 48 of the reinforcement frame member 45, the opening surrounding portion is prevented from following the opening displacement of the fracture-opening section 51, so that when the air bag 43 inflates, the fracture-opening section 51 quickly fractures along the fracture grooves 40c into the fracture-opening subsections 51a and 51b. Therefore, the fracture surfaces (peripheral end surfaces) of the fracture-opening subsections 51a and 51b are prevented from having sharp edges or burrs, so that the fracture-opening subsections 51a and 51b can have smooth fracture surfaces.

Further, since the opening surrounding portion is reinforced by the edge reinforcement portion 48 of the reinforcement frame member 45, the instrument panel cover 40, including the fracture-opening section 51, has enhanced resistance to pressing force that is applied to the instrument panel cover 40 from above, to thereby prevent breakage or deformation of the instrument panel cover 40 during periods in which the airbag is not operated.

In the first embodiment, the reinforcement frame member 45 is formed of a thermoplastic resin material as in the case of the instrument panel cover 40; and the upper surfaces of the fracture-section reinforcement portions 47a and 47b and the edge reinforcement portion 48 of the reinforcement frame member 45, which surfaces face the instrument panel cover 40, are joined to the instrument panel cover 40 by means of vibration welding, via the projections 50, which assume the form of broken ridges formed on the upper surfaces of the fracture-section reinforcement portions 47a and 47b and the edge reinforcement portion 48. Thus, the work for welding the reinforcement frame member 45 to the instrument panel cover 40 can be performed easily, without generation of thermal deformation of the welded portions.

The airbag case 44 is separably connected to the reinforcement frame member 45. Thus, when a car is to be scrapped, the airbag case 44 can be easily detached from the reinforcement frame member 45, so that an inflater and other relevant components, which are categorized as industrial waste, can be easily removed for proper disposal to thereby prevent potential environmental contamination.

Figure 7A:
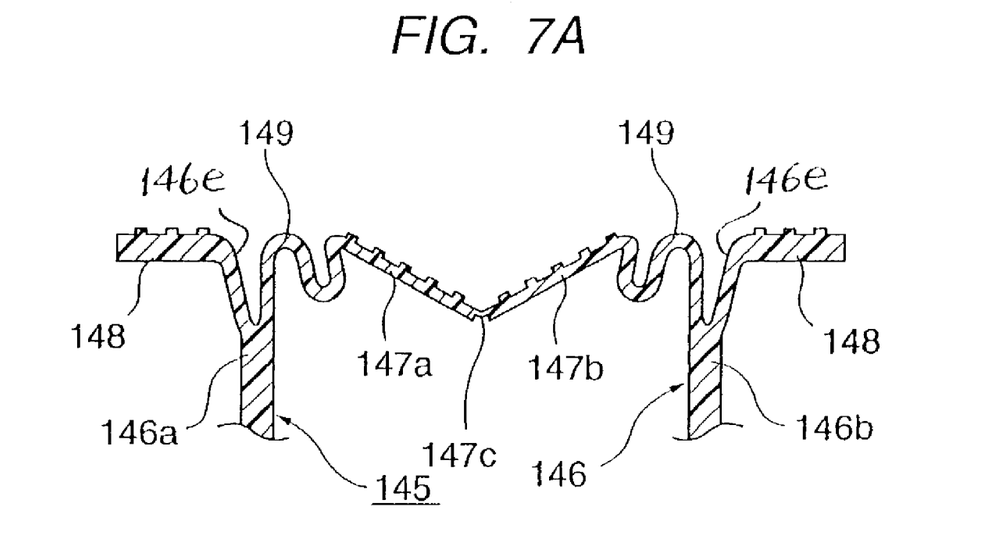
FIGS. 7A and 7B are vertical cross-sectional views showing a modification of the reinforcement frame member of the airbag apparatus according to the first embodiment.
Figure 7B:
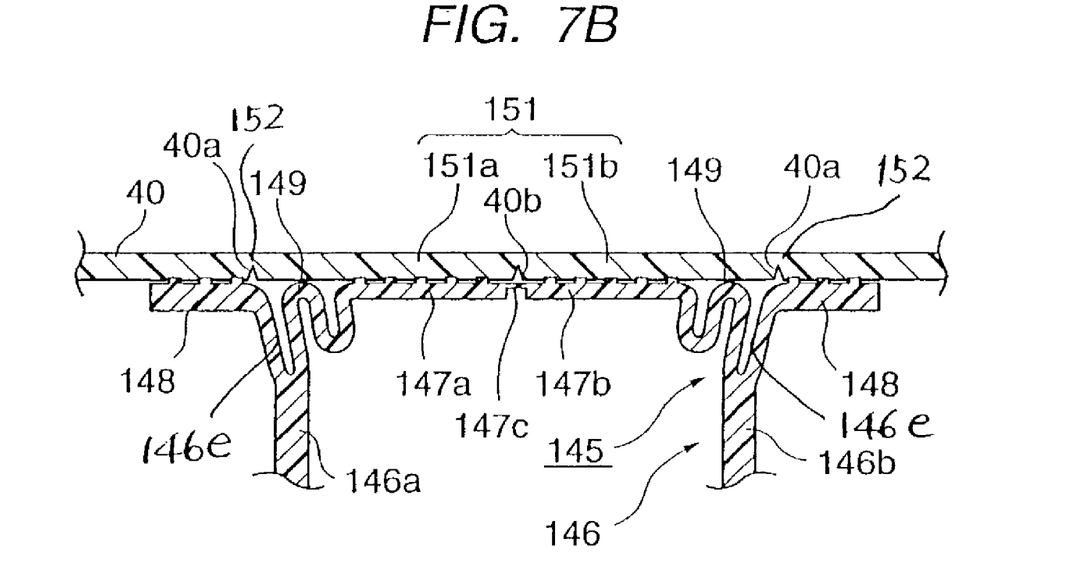

FIGS. 7A and 7B are vertical cross-sectional views showing a modification of the reinforcement frame member of the airbag apparatus according to the first embodiment.

In this modification, a reinforcement frame member 145 is molded in such a manner that distal end portions of a pair of fracture-section reinforcement portions 147a and 147b extending from a frame portion 146 via wavy-shaped hinge portions 149 are joined together by means of a thin wall portion 147c, and the thin wall portion 147c is located below or above the highest points of the hinge portions 149 so as to increase the lengths of portions of the fracture-section reinforcement portions 147a and 147b facing the reverse surface of the instrument panel cover 40, to thereby increase the area of a vibration-welded portion. The fracture-section reinforcement portions 147a and 147b and an edge reinforcement portion 148 are fixed to the reverse surface of the instrument panel cover 40 as follows. The edge reinforcement portion 148 is first positioned at the circumferential edge of a fracture-opening section; the fracture-section reinforcement portions 147a and 147b are then positioned in a state where the hinge portions 149, each formed of a wavy bent section, have been compressed and shifted toward inclined connection walls 146e of the edge reinforcement portion 148; and the fracture-section reinforcement portions 147a and 147b are then joined to fracture-opening subsections 151a and 151b by means of vibration welding.

In this configuration, the areas of the fracture-section reinforcement portions 147a and 147b vibration-welded to the reverse surfaces of fracture-opening subsections 151a and 151b can be increased as compared to the case of the above-described first embodiment, whereby secure welding is attained. In addition, since the extendable hinge portions 149 can be disposed in the vicinity of hinge portions 152 of the fracture-opening subsections 151a and 151b, the hinge portions 149 can be elongated to a greater extent when the fracture-section reinforcement portions 147a and 147b are opened outward in opposite directions. Therefore, impact force acting on the welded portion between the front and rear fracture-opening subsections and the fracture-section reinforcement portions can be eliminated.

The above embodiment employs a configuration such that the fracture-opening section 51 is split open in opposite directions. However, the present invention is not limited thereto and can be applied to the case where the fracture-opening section 51 is split open in a single direction. In this case, the configuration of the fracture-section reinforcement portion to be welded to the inner surface of the instrument panel cover 40 is modified appropriately.

Figure 8:
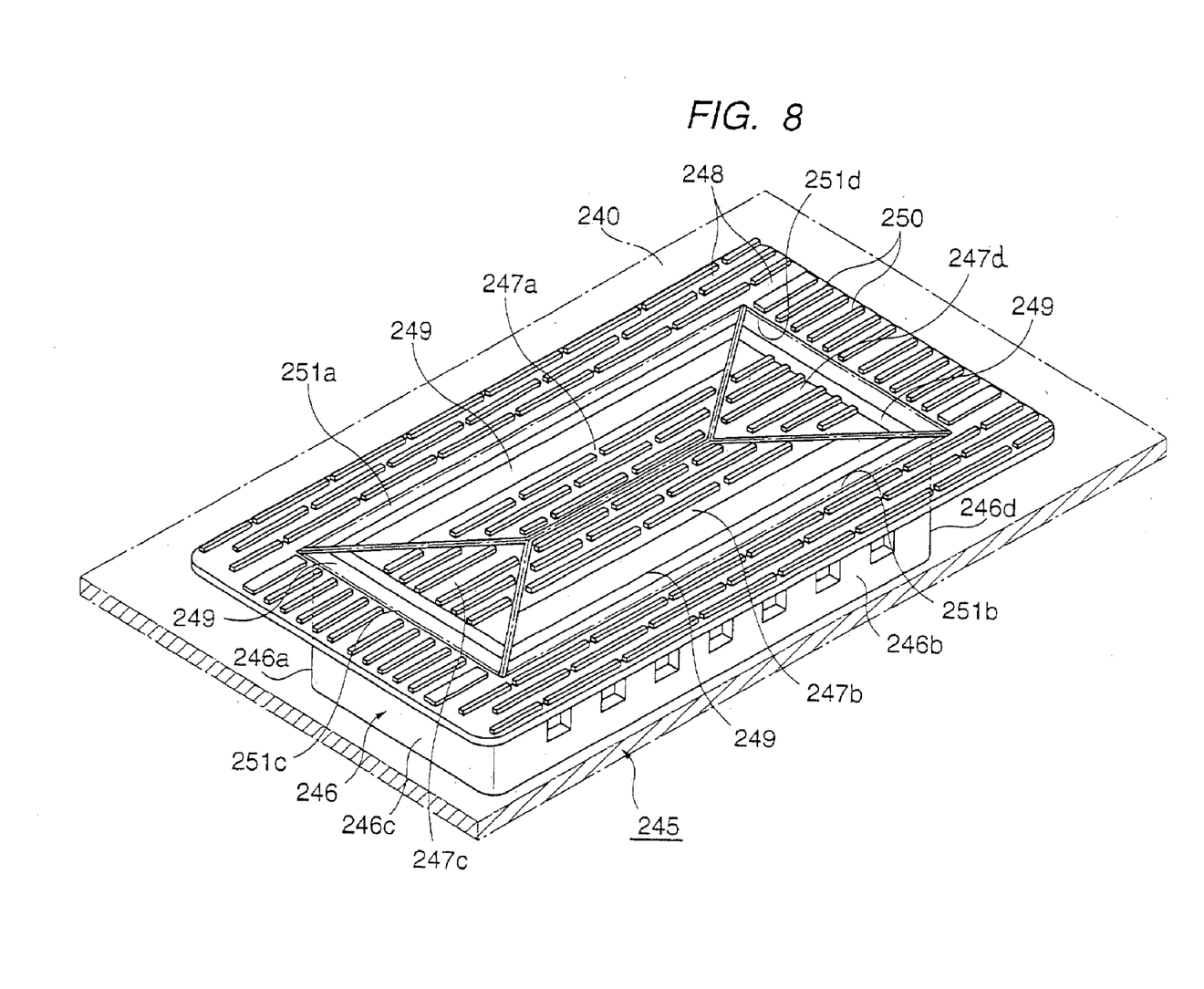
FIG. 8 is an overall perspective view of a reinforcement frame member according to a second embodiment of the present invention, showing a state in which the reinforcement frame member is applied to an instrument panel cover having a fracture-opening section which is opened toward four directions.
Figure 9:
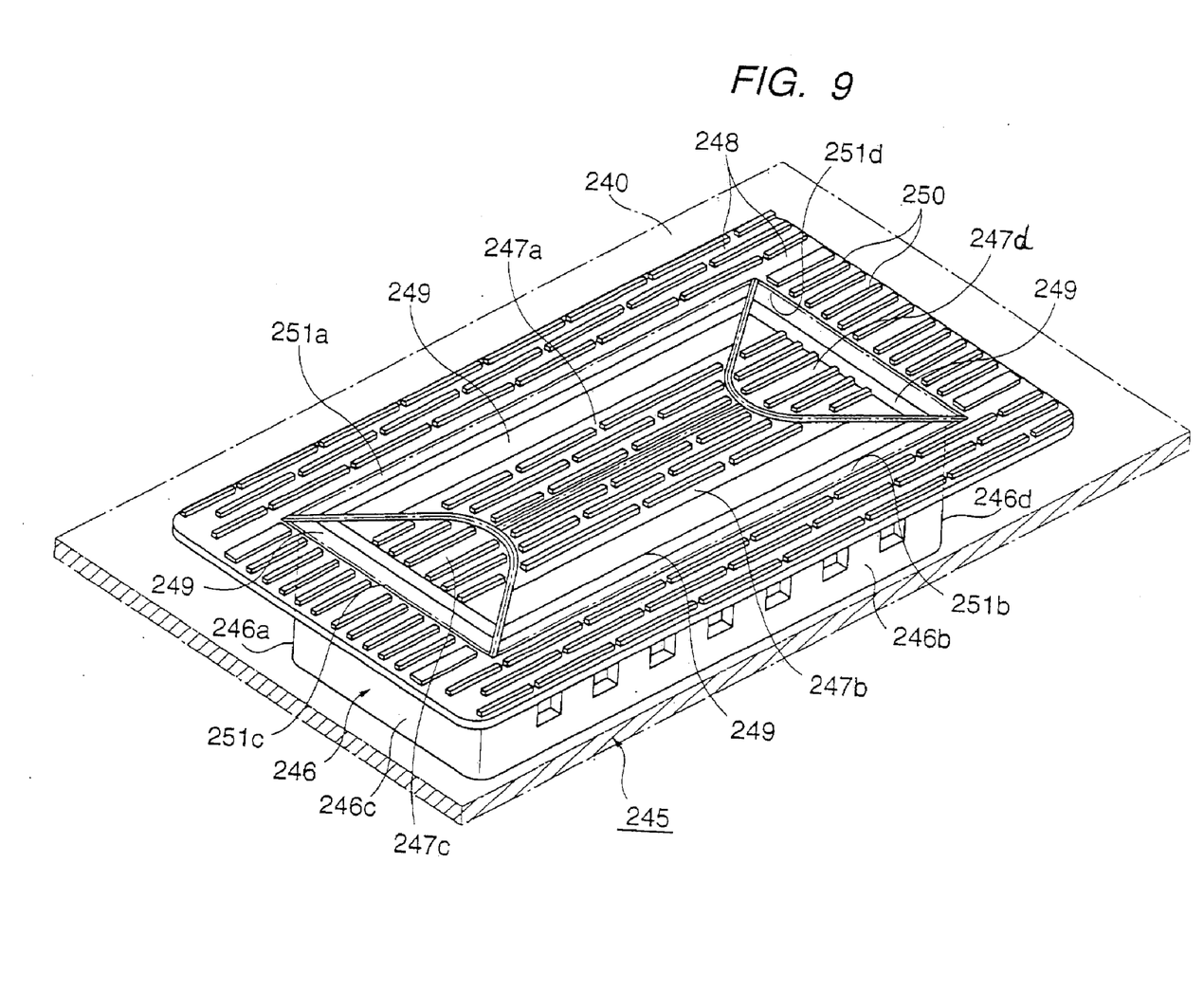
FIG. 9 is an overall perspective view of a reinforcement frame member according to a modification of the second embodiment of the present invention.
Figure 10:
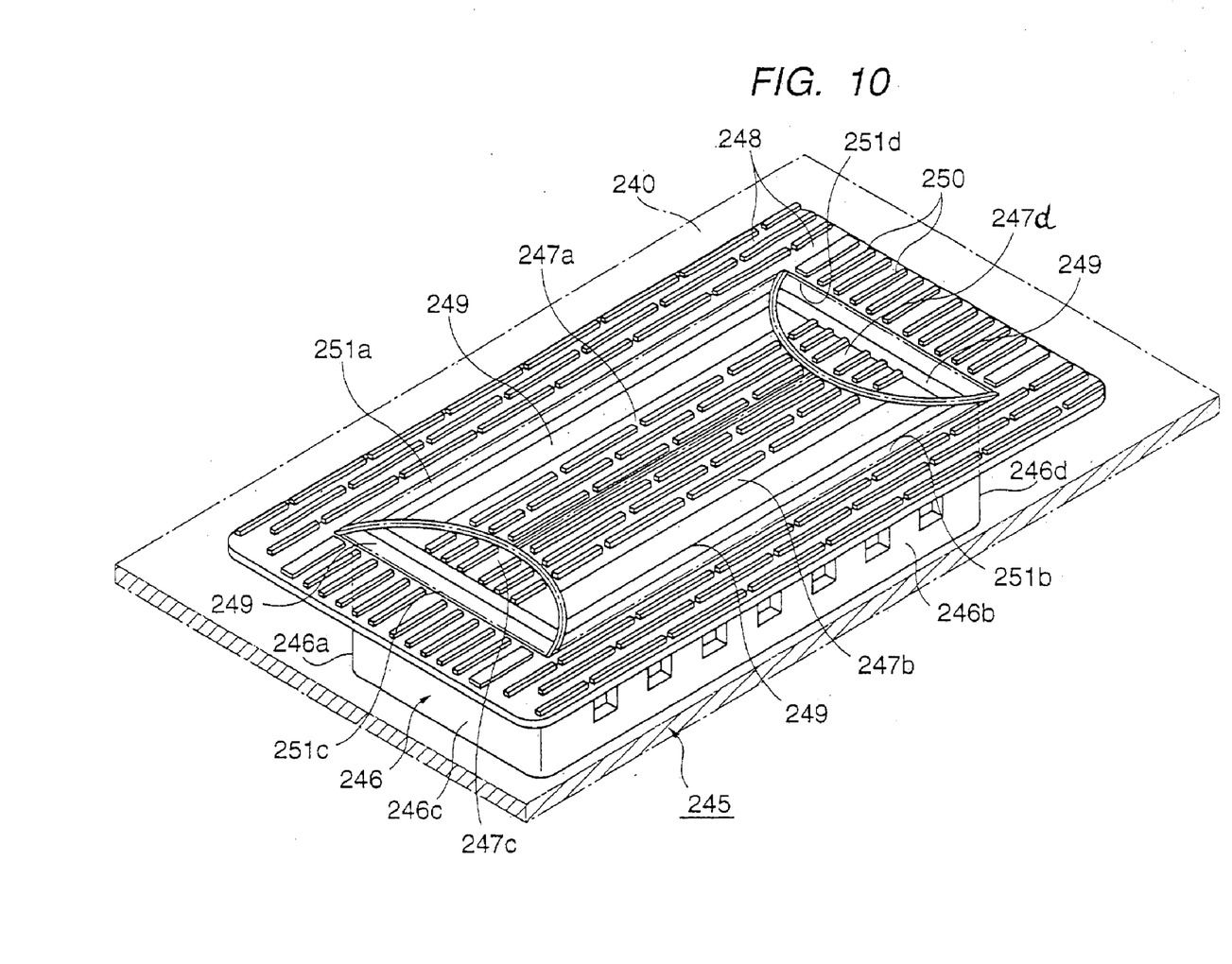
FIG. 10 is an overall perspective view of a reinforcement frame member according to another modification of the second embodiment of the present invention.

FIGS. 8 to 10 shows reinforcement frame members according to a second embodiment of the present invention, wherein each drawing shows a state in which a reinforcement frame member is applied to an instrument panel cover having a fracture-opening section which is opened toward four directions.

As shown in FIG. 8, a reinforcement frame member 245 according to the second embodiment has a configuration similar to that of the reinforcement frame member 45 of the first embodiment, except that the reinforcement frame member 245 has four fracture-section reinforcement portions 247a, 247b, 247c, and 247d, which are to be vibration-welded to reverse surfaces of four fracture-opening subsections 251a, 251b, 251c, and 251d of an instrument panel cover 240 indicated by chain lines.

Specifically, in the configuration shown in FIG. 8, the fracture-opening subsections 251a, 251b, 251c, and 251d, which are defined through formation of fracture grooves on the reverse surface of the instrument panel cover 240, form a rectangular fracture-opening section, which can be opened in four directions, while fracturing along boundaries between the right-hand and left-hand triangular fracture-opening subsections 251c and 251d and the front and rear trapezoidal fracture-opening subsections 251a and 251b. Notably, the shorter sides of the trapezoids defined by the trapezoidal fracture-opening subsections 251a and 251b coincide with a line connecting the vertexes of the triangles defined by the fracture-opening subsections 251c and 251d. The reinforcement frame member 245 has a horizontally extending edge reinforcement portion 248, which branches outward from the upper end of a rectangular frame portion 246. Further, the reinforcement frame member 245 has the above-described four fracture-section reinforcement portions 247a, 247b, 247c, and 247d, which branch and extend inward from the upper end of the rectangular frame portion 246 via corresponding hinge portions 239 each having a wavy bent section. Among these fracture-section reinforcement portions 247a, 247b, 247c, and 247d, the reinforcement portions 247a and 247b, which extend from the respective upper ends of front and rear walls 246a and 246b of the frame portion 246, each assume a trapezoidal shape corresponding to that of the front and rear trapezoidal fracture-opening subsections 251a and 251b, whereas the reinforcement portions 247c and 247d, which extend from the respective upper ends of left and right walls 246c and 246d of the frame portion 246, each assume a triangular shape corresponding to that of the left and right trapezoidal fracture-opening subsections 251c and 251d.

A plurality of projections 250, each formed of a broken ridge, are provided at predetermined intervals on the upper surfaces of the fracture-section reinforcement portions 247a to 247d and on the upper surface of the edge reinforcement portion 248. The fracture-section reinforcement portions 247a to 247d and the edge reinforcement portion 248 are fixed, by means of vibration welding, to the reverse surface of the instrument panel cover 40 via the projections 250.

Notably, when the projections 250 are configured in such a manner that each projection is broken at predetermined positions along the longitudinal direction, thermal deformation during vibration welding can be reduced. However, the shape of the projections 250 is not limited to the shape of a broken ridge and the projections 250 may assume the shape of a continuous ridge.

FIG. 9 shows a reinforcement frame member according to a modification of the second embodiment. The reinforcement frame member shown in FIG. 9 has the same configuration as that of the reinforcement frame member according the second embodiment, except that the vertex potions of the right-hand and left hand triangular fracture-section reinforcement portions 247c and 247d are each formed by a curved surface. This configuration prevents formation of sharp fracture surfaces, which would otherwise be formed at the vertex potions of the opened fracture-opening subsections and the opened fracture-section reinforcement portions at the time inflation of the airbag. Notably, portions identical with or corresponding to those shown in FIG. 8 are denoted by the same reference numerals, and their repeated descriptions are omitted.

FIG. 10 shows a reinforcement frame member according to another modification of the second embodiment. The reinforcement frame member shown in FIG. 10 has the same configuration as that of the reinforcement frame member shown in FIG. 9, except that the right-hand and left hand fracture-section reinforcement portions 247c and 247d each assume a semi-circular shape. Notably, portions identical with or corresponding to those shown in FIG. 8 are denoted by the same reference numerals, and their repeated descriptions are omitted.

In the above-described embodiments, the hinge grooves 40a and the fracture grooves 40b and 40c are formed through application of a laser beam to the inside surface of the instrument panel cover 40. However, the present invention is not limited thereto. The grooves may be formed through milling or molding. When milling is to be employed, the inside surface of the instrument panel cover is grooved in such a manner as to leave a wall thickness of 0.5 mm-0.8 mm on the front surface side of the instrument panel cover. Alternatively, the grooves may be integrally formed in the course of molding of the instrument panel cover.

Obviously, numerous modifications and variations of the present invention are possible in light of the above teachings. It is therefore to be understood that within the scope of the appended claims, the present invention may be practiced otherwise than as specifically described herein.

What is claimed is:

1. An airbag apparatus for an automobile comprising:
    an airbag case for accommodating an airbag in a folded condition, the airbag case being disposed behind a surface panel provided within the automobile;
    a fracture-opening section of the surface panel, the fracture-opening section facing an opening of the airbag case and being defined by means of fracture grooves formed on an inside surface of the surface panel; and
    a reinforcement frame member having a frame portion, at least one fracture-section reinforcement portion, and an edge reinforcement portion, which are integrally formed at an upper end portion of the frame portion,
    wherein the frame portion has an engagement portion to which the airbag case is connected, the fracture-section reinforcement portion is joined to the inside surface of the surface panel to cover and reinforce the fracture-opening section, and the edge reinforcement portion is joined to the inside surface of the surface panel to cover and reinforce a surface panel portion surrounding the fracture-opening section;
    wherein the frame portion has a front side wall, a rear side wall, a left side wall, and a right side wall, which form a rectangular tubular shape; the edge reinforcement portion extends outward from the upper end portion of the frame portion in a generally horizontal direction; the fracture-section reinforcement portion extends inward from the upper end portion of the frame portion via a hinge portion having a wavy bent section; and the fracture-section reinforcement portion and the edge reinforcement portion are fixed to the inside surface of the surface panel; and
    wherein the fracture-opening section of the surface panel is defined to have a rectangular shape and to be opened toward a single direction; and the reinforcement frame member has a single fracture-section reinforcement portion extending from the front or rear side wall of the frame portion via a hinge portion.

2. The airbag apparatus of claim 1, wherein the fracture-section reinforcement portion and the edge reinforcement portion are fixed to the inside surface of the surface panel by means of vibration welding.

3. The airbag apparatus according to claim 2, wherein the corresponding hinge portions have each a wavy bent section.

4. An airbag apparatus for an automobile comprising:
an airbag case for accommodating an airbag in a folded condition, the airbag case being disposed behind a surface panel provided within the automobile;
a fracture-opening section of the surface panel, the fracture-opening section facing an opening of the airbag case and being defined by means of fracture grooves formed on an inside surface of the surface panel; and
a reinforcement frame member having a frame portion, at least one fracture-section reinforcement portion, and an edge reinforcement portion, which are integrally formed at an upper end portion of the frame portion,
wherein the frame portion has an engagement portion to which the airbag case is connected, the fracture-section reinforcement portion is joined to the inside surface of the surface panel to cover and reinforce the fracture-opening section, and the edge reinforcement portion is joined to the inside surface of the surface panel to cover and reinforce a surface panel portion surrounding the fracture-opening section;
wherein the frame portion has a front side wall, a rear side wall, a left side wall, and a right side wall, which form a rectangular tubular shape; the edge reinforcement portion extends outward from the upper end portion of the frame portion in a generally horizontal direction; the fracture-section reinforcement portion extends inward from the upper end portion of the frame portion via a hinge portion having a wavy bent section; and the fracture-section reinforcement portion and the edge reinforcement portion are fixed to the inside surface of the surface panel; and
wherein the fracture-opening section of the surface panel is defined to have a rectangular shape and to be cut into left-hand, right-hand, front, and rear fracture-opening subsections to be opened toward four directions; and the reinforcement frame member has four fracture-section reinforcement portions extending from the front, rear, left, and right side walls, respectively, of the frame portion via corresponding hinge portions each having a wavy bent section.

5. An airbag apparatus for an automobile, comprising:
an airbag case for accommodating an airbag in a folded condition, the airbag case being disposed behind a surface panel provided within the automobile;
a fracture-opening section of the surface panel, the fracture-opening section facing an opening of the airbag case and being defined by means of fracture grooves formed on an inside surface of the surface panel; and
a reinforcement frame member having a frame portion, at least one fracture-section reinforcement portion, and an edge reinforcement portion, which are integrally formed at an upper end portion of the frame portion,
wherein the frame portion has an engagement portion to which the airbag case is connected, the fracture-section reinforcement portion is joined to the inside surface of the surface panel to cover and reinforce the fracture-opening section, and the edge reinforcement portion is joined to the inside surface of the surface panel to cover and reinforce a surface panel portion surrounding the fracture-opening section;
wherein a plurality of projections, each assuming a shape of a ridge, are formed at predetermined intervals on surfaces of the fracture-section reinforcement portion and the edge reinforcement portion, the surfaces facing the inside surface of the surface panel; and the fracture-section reinforcement portion and the edge reinforcement portion are joined, by means of vibration welding, to the inside surface of the surface panel via the projections.

6. An airbag apparatus according to claim 5, wherein the frame portion has a front side wall, a rear side wall, a left side wall, and a right side wall which form a rectangular tubular shape; the edge reinforcement portion extends outward from the upper end portion of the frame portion in a generally horizontal direction; the fracture-section reinforcement portion extends inward from the upper end portion of the frame portion via a hinge portion having a wavy bent section; and the fracture-section reinforcement portion and the edge reinforcement portion are fixed to the inside surface of the surface panel by means of vibration welding.

7. An airbag apparatus according to claim 6, wherein the fracture-opening section of the surface panel is defined to have a rectangular shape and to be cut, along a longitudinally extending center line, into two fracture-opening subsections to be opened toward opposite directions; and the reinforcement frame member has a pair of fracture-section reinforcement portions extending from the front and rear side walls, respectively, of the frame portion via corresponding binge portions each having a wavy bent section.

8. An airbag apparatus according to claim 7
wherein the reinforcement frame member is formed of a thermoplastic resin material.

9. An airbag apparatus according to claim 7
wherein the fracture-section reinforcement portion and the edge reinforcement portion of the reinforcement frame member are vibration-welded to the inside surface of the surface panel in a state in which a hinge portion of the reinforcement frame member is compressed toward an inclined connection portion of the edge reinforcement portion.

10. The airbag apparatus of claim 7, wherein the airbag case is separably connected to the frame portion of the reinforcement frame member.

11. An airbag apparatus for an automobile according to claim 5, wherein each of the projections assumes a shape of a broken ridge.

12. An airbag apparatus for an automobile, comprising:
an airbag case for accommodating an airbag in a folded condition, the airbag case being disposed behind a surface panel provided within the automobile;
a fracture-opening section of the surface panel, the fracture-opening section facing an opening of the airbag case and being defined by means of fracture grooves formed on an inside surface of the surface panel; and
a reinforcement frame member having a frame portion, at least one fracture-section reinforcement portion, and an edge reinforcement portion, which are integrally formed at an upper end portion of the frame portion;
wherein the frame portion has an engagement portion to which the airbag case is connected, the fracture-section reinforcement portion is joined to the inside surface of the surface panel to cover and reinforce the fracture-opening section, and the edge reinforcement portion is joined to the inside surface of the surface panel to cover and reinforce a surface panel portion surrounding the fracture-opening section;
wherein the engagement portion of the frame portion to which the airbag case is connected is formed in each of the front and rear side walls of the frame portion and is constituted by a group of rectangular holes; and hooks of the airbag case are inserted into the rectangular holes in such a manner that the hooks engage wall surfaces of the rectangular holes when the airbag inflates.

* * * * *